(12) United States Patent
Li

(10) Patent No.: US 10,708,943 B2
(45) Date of Patent: Jul. 7, 2020

(54) METHODS FOR CONFIGURING AND RECEIVING SCHEDULING SIGNALING AND RELATED DEVICES

(71) Applicant: YULONG COMPUTER TELECOMMUNICATION SCIENTIFIC (SHENZHEN) CO., LTD., Shenzhen (CN)

(72) Inventor: Ming-Ju Li, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 16 days.

(21) Appl. No.: 16/088,087

(22) PCT Filed: Oct. 31, 2016

(86) PCT No.: PCT/CN2016/104003
§ 371 (c)(1),
(2) Date: Sep. 25, 2018

(87) PCT Pub. No.: WO2017/161884
PCT Pub. Date: Sep. 28, 2017

(65) Prior Publication Data
US 2019/0090267 A1    Mar. 21, 2019

(30) Foreign Application Priority Data

Mar. 25, 2016   (CN) .......................... 2016 1 0178389

(51) Int. Cl.
*H04W 72/12*       (2009.01)
*H04W 16/14*       (2009.01)
(Continued)

(52) U.S. Cl.
CPC ....... *H04W 72/1289* (2013.01); *H04W 16/14* (2013.01); *H04W 72/042* (2013.01);
(Continued)

(58) Field of Classification Search
CPC . H04W 16/14; H04W 72/12; H04W 72/1289; H04W 72/1278; H04W 72/042;
(Continued)

(56) References Cited

U.S. PATENT DOCUMENTS 10,257,855 B2 *   4/2019   Babaei ................ H04W 74/006
2014/0211750 A1 *  7/2014   Larsson ................ H04W 68/02
                                                                     370/330
(Continued)

FOREIGN PATENT DOCUMENTS

CN       104936189 A     9/2015
CN       105282858 A     1/2016
(Continued)

OTHER PUBLICATIONS

CATT, "R1-153926 Discussion on LAA DL transmission methods", Aug. 24-28, 2015, 3GPP TSG RAN WG1 Meeting #82, pp. 1-7 (Year: 2015).*
(Continued)

*Primary Examiner* — Un C Cho
*Assistant Examiner* — Shah M Rahman
(74) *Attorney, Agent, or Firm* — ScienBiziP, P.C.

(57) ABSTRACT

The embodiments of the present disclosure provide a method for configuring scheduling signaling on an unlicensed carrier. The method includes: generating, by a base station, a carrier scheduling configuration message of the unlicensed carrier, the carrier scheduling configuration message including an uplink scheduling type identifier and a downlink scheduling type identifier; and sending, by the base station, Radio Resource Control (RRC) signaling to
(Continued)

user equipment that carries the carrier scheduling configuration message. Scheduling flexibility and throughput of communication systems can be improved by implementing the present disclosure.

12 Claims, 8 Drawing Sheets

(51) Int. Cl.
*H04W 74/00* (2009.01)
*H04W 72/04* (2009.01)

(52) U.S. Cl.
CPC .......... *H04W 72/12* (2013.01); *H04W 74/004* (2013.01); *H04W 74/006* (2013.01)

(58) Field of Classification Search
CPC ............. H04W 72/04; H04W 72/0413; H04W 74/006; H04W 74/004
See application file for complete search history.

(56) References Cited

U.S. PATENT DOCUMENTS

| | | | | |
|---|---|---|---|---|
| 2015/0245376 | A1* | 8/2015 | Bashar | H04L 1/18 370/277 |
| 2015/0312793 | A1* | 10/2015 | Jeon | H04W 28/0205 370/329 |
| 2016/0183249 | A1* | 6/2016 | Lei | H04L 5/001 370/336 |
| 2016/0227523 | A1* | 8/2016 | Desai | H04L 5/001 |
| 2016/0227524 | A1* | 8/2016 | Choi | H04L 5/0053 |
| 2016/0278118 | A1* | 9/2016 | Yerramalli | H04L 5/001 |
| 2016/0309451 | A1* | 10/2016 | Ye | H04W 72/042 |
| 2017/0013635 | A1* | 1/2017 | Quan | H04W 72/12 |
| 2017/0041922 | A1* | 2/2017 | Chen | H04L 47/365 |
| 2017/0086174 | A1* | 3/2017 | Zhang | H04W 72/04 |
| 2017/0135090 | A1* | 5/2017 | Yin | H04L 1/1671 |
| 2017/0135127 | A1* | 5/2017 | Nogami | H04W 72/1289 |
| 2017/0150367 | A1* | 5/2017 | Han | H04W 16/14 |
| 2017/0195999 | A1* | 7/2017 | Feng | H04W 76/27 |
| 2017/0273056 | A1* | 9/2017 | Papasakellariou | H04W 52/281 |
| 2017/0311322 | A1* | 10/2017 | Kim | H04W 72/12 |
| 2017/0311337 | A1* | 10/2017 | Mo | H04W 72/12 |
| 2017/0339641 | A1* | 11/2017 | Nigam | H04W 52/0216 |
| 2017/0374569 | A1* | 12/2017 | Lee | H04L 1/00 |
| 2018/0092128 | A1* | 3/2018 | Um | H04W 72/0406 |
| 2018/0103458 | A1* | 4/2018 | Tooher | H04W 16/14 |
| 2018/0159665 | A1* | 6/2018 | Yang | H04W 72/042 |
| 2018/0167901 | A1* | 6/2018 | Wang | H04W 56/0005 |
| 2018/0176892 | A1* | 6/2018 | Kim | H04W 52/04 |
| 2018/0199369 | A1* | 7/2018 | Larsson | H04W 74/006 |
| 2018/0213569 | A1* | 7/2018 | Guan | H04L 5/0057 |
| 2018/0242364 | A1* | 8/2018 | Park | H04W 74/08 |
| 2019/0069312 | A1* | 2/2019 | Oh | H04W 72/1284 |
| 2019/0327752 | A1* | 10/2019 | Kim | H04L 5/0094 |

FOREIGN PATENT DOCUMENTS

| | | |
|---|---|---|
| CN | 105356967 A | 2/2016 |
| CN | 105682243 A | 6/2016 |
| CN | 105682244 A | 6/2016 |
| WO | 2014120055 A1 | 8/2014 |

OTHER PUBLICATIONS

Sharp, "R1-155570 Scheduling methods for LAA SCell", Oct. 5-9, 2015, 3GPP TSG RAN WG1 Meeting #82bis, pp. 1-5 (Year: 2015).*

Nokia Networks et al: "On LAA PUSCH scheduling and UL grant enhancements", 3GPP Draft; R1-160788, 3rd Generation Partnership Project (3GPP), Mobile Competence Centre ; 650, Route Des Lucioles ; F-06921 Sophia-Antipolis Cedex; France, vol. RAN WG1, No. St. Julian's, Malta; Feb. 15, 2016-Feb. 19, 2016 Feb. 14, 2016 (Feb. 14, 2016), XP051054115.

Institute for Information Industry (III): "Discussion on LAA Uplink Channel Access",3GPP Draft; R1-160989 Discussion on LAA Uplink Channel Access, 3rd Generation Partnership Project (3GPP), Mobile Competence Centre ; 650, Route Des Lucioles ; F-06921 Sophia-Antipolis Cedex; France, vol. RAN WG1,No. St Julian's, Malta; Feb. 15, 2016-Feb. 19, 2016 Feb. 14, 2016 (Feb. 14, 2016), XP051054293.

Ericsson: "On Scheduling in LAA with Downlink and Uplink Transmissions",3GPP Draft; R1-153135, 3rd Generation Partnership Project (3GPP), Mobile Competence Centre ; 650, Route Des Lucioles ; F-06921 Sophia-Antipolis Cedex; France, vol. RAN WG1,No. Fukuoka, Japan; May 25, 2015-May 29, 2015 May 24, 2015 (May 24, 2015), XP050973094, Retrieved from the Internet:.

* cited by examiner

METHODS FOR CONFIGURING AND RECEIVING SCHEDULING SIGNALING AND RELATED DEVICES

CROSS-REFERENCE TO RELATED APPLICATIONS

The present disclosure claims a priority of a Chinese patent application, which is filed in China National Intellectual Property Administration (CNIPA) on Mar. 25, 2016, named "methods for configuring and receiving scheduling signaling and related devices," and numbered 201610178389.8. All contents of Chinese patent application are hereby incorporated by reference in the present application.

FIELD

The present disclosure relates to communication technologies, in particular to methods for configuring and receiving scheduling signaling and related devices.

BACKGROUND

With a rapid increase of communication services, 3rd Generation Partnership Project (3GPP) licensed frequency spectrums become insufficient to provide higher network capacity. In order to further improve the utilization of frequency spectrum resources, 3GPP is discussing how to use unlicensed frequency spectrums such as 2.4 GHz and 5.8 GHz frequency bands. These unlicensed frequency spectrums are currently mainly used by Wireless-Fidelity (Wi-Fi), BLUETOOTH™, radar, medical, and other systems. Generally, access technologies designed for licensed frequency bands, such as Long Term Evolution (LTE), are not suitable for use in unlicensed frequency bands, because access technologies such as LTE have very high requirements for frequency spectrum efficiency and user experience optimization. However, carrier aggregation makes it possible to deploy LTE to unlicensed frequency bands. 3GPP proposes the concept of Licensed Assisted Access (LAA), which uses unlicensed frequency spectrums with the help of LTE licensed frequency spectrums.

Good orthogonality in LTE networks ensures a low interference level, thus there is no need to consider whether there are other base stations or other users around which are transmitting data, in uplink and downlink transmissions of a base station and a user. If LTE is used on an unlicensed frequency band without considering whether other devices are using the unlicensed frequency band, Wi-Fi device is subjected to great interference. As long as there is a service, the LTE will perform a service transmission. No monitoring rule exists. An idle state of a channel can be detected only after the service transmission of the LTE is completed. After that, the Wi-Fi device can perform a transmission.

Therefore, when LTE uses unlicensed frequency bands, one key point is to ensure that the LAA can coexist with the existing access technologies (such as Wi-Fi) on a fair-friendly basis. However, there is no listen before talk (LBT) mechanism to avoid collisions in traditional LTE systems. In order to better coexist with Wi-Fi, an LBT mechanism is needed for the LTE. In this way, if a channel is detected to be busy when the LTE uses the unlicensed frequency spectrum, the frequency band cannot be occupied. If the channel is detected to be idle when the LTE network uses the unlicensed frequency spectrum, the frequency band can be occupied. The prior art does not provide a scheme for performing uplink and downlink scheduling on an unlicensed carrier. Therefore, how to perform uplink and downlink scheduling on an unlicensed carrier is a hot research topic.

SUMMARY

The technical problem to be solved by the embodiments of the present disclosure is to provide methods for configuring and receiving scheduling signaling and related devices, to improve flexibility of scheduling and throughput of communication systems.

In order to solve the above-mentioned technical problem, a method for configuring scheduling signaling on an unlicensed carrier is provided in one embodiment of the present disclosure, the method including:

generating, by a base station, a carrier scheduling configuration message of the unlicensed carrier, the carrier scheduling configuration message including an uplink scheduling type identifier and a downlink scheduling type identifier; and sending, by the base station, Radio Resource Control (RRC) signaling to user equipment (UE) that carries the carrier scheduling configuration message.

Correspondingly, a method for receiving scheduling signaling on an unlicensed carrier is further provided in one embodiment of the present disclosure, the method including:

receiving, by UE, RRC signaling sent by a base station that carries a carrier scheduling configuration message of the unlicensed carrier, the carrier scheduling configuration message including: an uplink scheduling type identifier and a downlink scheduling type identifier; and monitoring, by the UE, UE specific search space in a Physical Downlink Control Channel (PDCCH) of a scheduling cell and/or a cell on the unlicensed carrier according to the carrier scheduling configuration message.

Correspondingly, a base station is further provided in one embodiment of the present disclosure, the base station including:

a generation module configured to generate a carrier scheduling configuration message of an unlicensed carrier, the carrier scheduling configuration message including an uplink scheduling type identifier and a downlink scheduling type identifier; and a sending module configured to send, to user equipment, RRC signaling that carries the carrier scheduling configuration message.

Correspondingly, user equipment is further provided in one embodiment of the present disclosure, the user equipment including:

a reception module configured to receive RRC signaling sent by a base station that carries a carrier scheduling configuration message of an unlicensed carrier, the carrier scheduling configuration message including: an uplink scheduling type identifier and a downlink scheduling type identifier; and a monitoring module configured to monitor UE specific search space in a PDCCH of a scheduling cell and/or a cell on the unlicensed carrier according to the carrier scheduling configuration message.

Implementation of the embodiments of the present disclosure will have the following advantages:

a base station separately configures scheduling signaling for an uplink scheduling type and an downlink scheduling type based on a feature that an unlicensed carrier cannot be continuously occupied, so that the base station can flexibly schedule transmission resources in uplink and downlink directions, improving a throughput of a communication system.

BRIEF DESCRIPTION OF THE DRAWINGS

In order to describe the technical solutions in embodiments of the present disclosure or in the prior art more clearly, the following briefly introduces the accompanying drawings needed for describing the embodiments. Obviously, the accompanying drawings in the following description show some embodiments of the present disclosure, and persons of ordinary skill in the art may still derive other drawings from these accompanying drawings without creative effort.

DETAILED DESCRIPTION

The following clearly and completely describes the technical solutions in the embodiments of the present disclosure with reference to the accompanying drawings in the embodiments of the present disclosure. Obviously, the described embodiments are a part rather than all of the embodiments of the present disclosure. All other embodiments acquired by persons of ordinary skill in the art based on the embodiments of the present disclosure without creative effort shall fall within the protective scope of the present disclosure.

Figure 1:
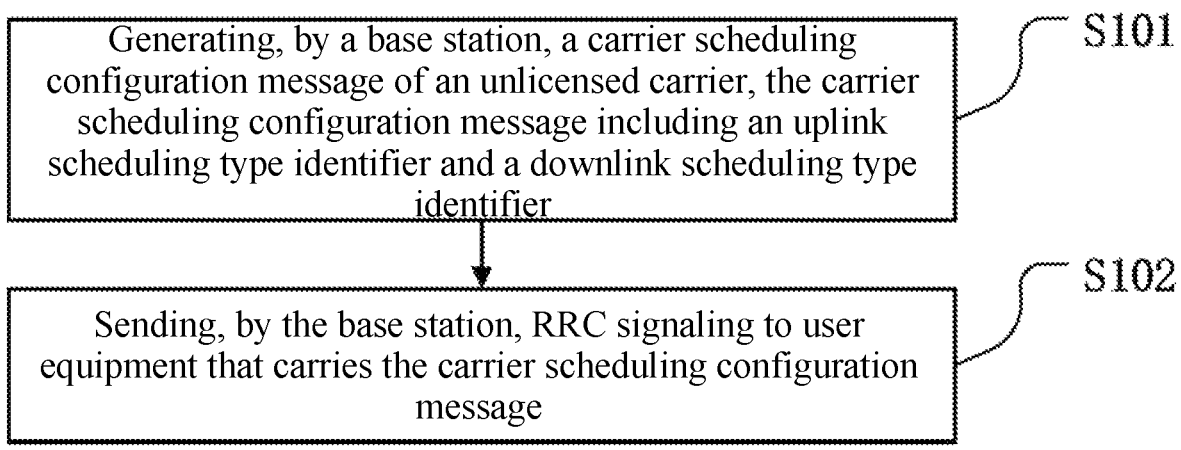
FIG. 1 is a flow chart of a method for configuring scheduling signaling on an unlicensed carrier in one embodiment of the present disclosure.

FIG. 1 is a flow chart of a method for configuring scheduling signaling on an unlicensed carrier in one embodiment of the present disclosure. In the embodiment of the present disclosure, the method includes:

S101 of, generating, by a base station, a carrier scheduling configuration message of the unlicensed carrier. The carrier scheduling configuration message may include an uplink scheduling type identifier and a downlink scheduling type identifier.

Specifically, the carrier scheduling configuration message may be used to indicate related parameters for scheduling a cell, i.e. a current Licensed Assisted Access (LAA) secondary cell (SCell) on an unlicensed carrier. Scheduling directions may include uplink scheduling and downlink scheduling. Scheduling types may include self-scheduling and cross-carrier scheduling. Self-scheduling may indicate that an LAA SCell sends its own resource scheduling information, and cross-carrier scheduling may indicate that other serving cells (for example, a primary serving cell on a licensed carrier) transmit the resource scheduling information of the LAA SCell. In order to distinguish scheduling types of an uplink scheduling and a downlink scheduling, an uplink scheduling type identifier and a downlink scheduling type identifier may be configured in the carrier scheduling configuration message. The uplink scheduling type identifier may be used to indicate a scheduling type in an uplink direction, and the downlink scheduling type identifier may be used to indicate a scheduling type in a downlink direction. It should be noted that, for self-scheduling, a scheduling cell and a scheduled cell may be both LAA SCells on an unlicensed carrier; for a cross-carrier scheduling, a scheduled cell may be a cell on the unlicensed carrier, i.e. an LAA SCell, and a scheduling cell may be a serving cell other than a cell on the unlicensed carrier, such as a primary serving cell on a licensed carrier. In this embodiment, allocation modes of uplink scheduling and downlink scheduling may be both semi-persistent scheduling.

In one possible embodiment, the uplink scheduling type identifier and the downlink scheduling type identifier may be represented by certain bits, and different values of the bits may indicate different scheduling types. For example, the uplink scheduling type identifier is denoted as UL-cif-presence, the downlink scheduling type identifier is denoted as DL-cif-presence, and each of the uplink scheduling type identifier and the downlink scheduling type identifier is represented by one bit. A value of 1 (or 0) of the bit corresponding to the UL-cif-presence indicates that the scheduling type of the uplink scheduling is an uplink self-scheduling. A value of 0 (or 1) of the bit corresponding to the UL-cif-presence indicates that the scheduling type of the uplink scheduling is an uplink cross-carrier scheduling. A value of 1 (or 0) of the bit corresponding to the DL-cif-presence indicates that the scheduling type of the downlink scheduling is a downlink self-scheduling. A value of 0 (or 1) of the bit corresponding to the DL-cif-presence indicates that the scheduling type of the downlink scheduling is a downlink cross-carrier scheduling.

It should be noted that the representation of the uplink scheduling type identifier and the downlink scheduling type identifier is not limited to the above, and may be configured as needed.

S102 of, sending, by the base station, Radio Resource Control (RRC) signaling to user equipment that carries the carrier scheduling configuration message.

Specifically, the base station may send, to the user equipment, the RRC signaling that carries the carrier scheduling configuration message, and the user equipment may receive uplink scheduling signaling or downlink scheduling signaling on a specified cell according to an indication of the carrier scheduling configuration message.

Optionally, the carrier scheduling configuration message may further include: an uplink scheduling cell identifier, a downlink scheduling cell identifier, Physical Downlink Shared Channel (PDSCH) starting symbol position information of an uplink scheduling cell, and PDSCH starting symbol position information of a downlink scheduling cell.

Specifically, the carrier scheduling configuration message may include two sets of scheduling cell identifiers and PDSCH starting symbol position information of scheduling cells: an uplink scheduling type identifier, a downlink scheduling type identifier, an uplink scheduling cell identifier, a downlink scheduling cell identifier, PDSCH starting symbol position information of an uplink scheduling cell, and PDSCH starting symbol position information of a downlink scheduling cell. The uplink scheduling cell identifier indicates an identity of a cell performing an uplink scheduling, the downlink scheduling cell identifier indicates an identity of a cell performing a downlink scheduling, the PDSCH starting symbol position information of the uplink scheduling cell indicates a position of a PDSCH starting symbol of the cell performing the uplink scheduling, and the PDSCH starting symbol position information of the downlink scheduling cell indicates a position of a PDSCH starting symbol of the cell performing the downlink scheduling.

Optionally, the uplink scheduling type identifier may indicate an uplink self-scheduling, the downlink scheduling type identifier may indicate a downlink self-scheduling, and the uplink scheduling cell identifier, the PDSCH starting symbol position information of the uplink scheduling cell, the downlink scheduling cell identifier, and the PDSCH starting symbol position information of the downlink scheduling cell may be null; or the uplink scheduling type identifier may indicate an uplink cross-carrier scheduling, the downlink scheduling type identifier may indicate a downlink self-scheduling, and the downlink scheduling cell identifier, and the PDSCH starting symbol position information of the downlink scheduling cell may be null; or the uplink scheduling type identifier may indicate an uplink cross-carrier scheduling, the downlink scheduling type identifier may indicate a downlink cross-carrier scheduling, and the uplink scheduling cell identifier and the downlink scheduling cell identifier may be the same or different.

Specifically, when configuring the carrier scheduling configuration message, the base station may configure an scheduling cell identifier and PDSCH starting symbol position information of a scheduling cell according to a scheduling type corresponding to the uplink scheduling type identifier and the downlink scheduling type identifier. When the base station configures the uplink scheduling type identifier to indicate an uplink self-scheduling, and configures the downlink scheduling type identifier to indicate a downlink self-scheduling, due to self-scheduling, the scheduling cell is a cell on the unlicensed carrier, i.e. a current LAA SCell, and a cell identifier and PDSCH starting symbol position information of the base station have been sent to user equipment in else signaling. Therefore, the base station does no need to additionally configure specific values of the uplink scheduling cell identifier, the downlink scheduling cell identifier, the PDSCH starting symbol position information of the uplink scheduling cell, and the PDSCH starting symbol position information of the downlink scheduling cell, for example, they are set to null. When the base station configures the uplink scheduling type identifier to indicate an uplink cross-carrier scheduling, and configures the downlink scheduling type identifier to indicate a downlink self-scheduling, the base station is required to configure the specific values of the uplink scheduling cell identifier and the PDSCH starting symbol position information of the uplink scheduling cell, and is not required to set the specific values of the downlink scheduling cell identifier and the PDSCH starting symbol position information of the downlink scheduling cell, for example, they are set to null. When the base station configures the uplink scheduling type identifier to indicate an uplink cross-carrier scheduling, and configures the downlink scheduling type identifier to indicate a downlink cross-carrier, the base station is required to set the specific values of the uplink scheduling cell identifier, the downlink scheduling cell identifier, the PDSCH starting symbol position information of the uplink scheduling cell, and the PDSCH starting symbol position information of the downlink scheduling cell. The uplink scheduling cell identifier and the downlink scheduling cell identifier may be the same or different.

Optionally, the carrier scheduling configuration message may further include: a scheduling cell identifier and PDSCH starting symbol position information of a scheduling cell.

Specifically, the carrier scheduling configuration message may include: an uplink scheduling type identifier, a downlink scheduling type identifier, a scheduling cell identifier, and PDSCH starting symbol position information of the scheduling cell. The carrier scheduling configuration message may include only one set of scheduling cell identifier and PDSCH starting symbol position information of the scheduling cell. The scheduling cell identifier and the PDSCH starting symbol position information of the scheduling cell may be configured for a cross-carrier scheduling.

Optionally, the uplink scheduling type identifier may indicate an uplink self-scheduling, the downlink scheduling type identifier may indicate a downlink self-scheduling, and the scheduling cell identifier and the PDSCH starting symbol position information of the scheduling cell may be null; or the uplink scheduling type identifier may indicate an uplink cross-carrier scheduling, the downlink scheduling type identifier may indicate a downlink self-scheduling, and the scheduling cell identifier and the PDSCH starting symbol position information of the scheduling cell correspond to an uplink scheduling; or the uplink scheduling type identifier may indicate an uplink cross-carrier scheduling, and the downlink scheduling type identifier may indicate a downlink cross-carrier scheduling, where the scheduling cell identifier and the PDSCH starting symbol position information of the scheduling cell correspond to an uplink scheduling and a downlink scheduling.

Specifically, when configuring the carrier scheduling configuration message, the base station may configure an scheduling cell identifier and PDSCH starting symbol position information of a scheduling cell according to a scheduling type corresponding to the uplink scheduling type identifier and the downlink scheduling type identifier. When the base station configures the uplink scheduling type identifier to indicate an uplink self-scheduling, and configures the downlink scheduling type identifier to indicate a downlink self-scheduling, the base station is not required to configure specific values of the scheduling cell identifier and the PDSCH starting symbol position information of the scheduling cell, for example, they are set to null. When the base station configures the uplink scheduling type identifier to indicate an uplink cross-carrier scheduling, and configures the downlink scheduling type identifier to indicate a downlink self-scheduling, the base station is required to configure the specific values of the scheduling cell identifier and the PDSCH starting symbol position information of the scheduling cell for an uplink cross-carrier scheduling. When the base station configures the uplink scheduling type identifier to indicate an uplink cross-carrier scheduling, and configures the downlink scheduling type identifier to indicate a downlink cross-carrier scheduling, the base station is required to configure the specific values of the scheduling cell identifier and the PDSCH starting symbol position information of the scheduling cell for an uplink scheduling and a downlink scheduling, that is, the scheduling cell identifiers of the uplink scheduling and the downlink scheduling are the same.

It can be seen from the above embodiment that the base station separately configures scheduling signaling for an uplink scheduling type and an downlink scheduling type based on a feature that unlicensed carriers cannot be continuously occupied, so that the base station can flexibly schedule transmission resources in the uplink direction and the downlink direction, improving a throughput of a communication system.

Figure 2:
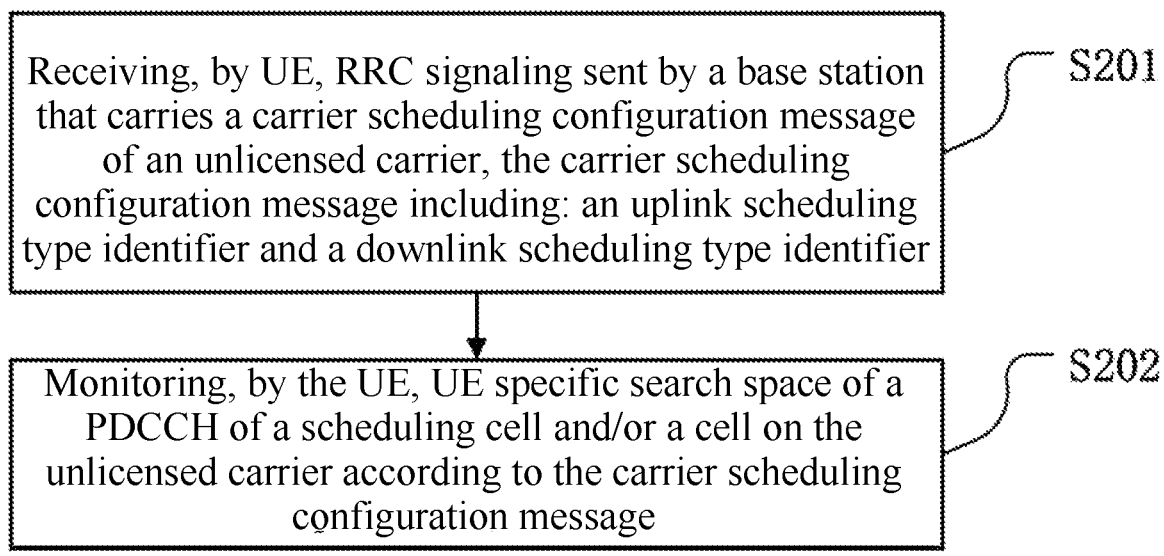
FIG. 2 is a flow chart of a method for receiving scheduling signaling on an unlicensed carrier in one embodiment of the present disclosure.

FIG. 2 is a flow chart of a method for receiving scheduling signaling on an unlicensed carrier in one embodiment of the present disclosure. In the embodiment of the present disclosure, the method includes:

S201 of, receiving, by user equipment, RRC signaling sent by a base station that carries a carrier scheduling configuration message of the unlicensed carrier. The carrier scheduling configuration message may include: an uplink scheduling type identifier and a downlink scheduling type identifier.

Specifically, the carrier scheduling configuration message may be used to indicate related parameters for scheduling an LAA SCell on an unlicensed carrier. Scheduling directions may include uplink scheduling and downlink scheduling. Scheduling types may include self-scheduling and cross-carrier scheduling. In order to distinguish scheduling types of uplink scheduling and downlink scheduling, an uplink scheduling type identifier and a downlink scheduling type identifier may be configured in the carrier scheduling configuration message. The uplink scheduling type identifier may be used to indicate a scheduling type of an uplink scheduling, and the downlink scheduling type identifier may indicate a scheduling type of a downlink scheduling. It should be noted that an allocation mode of the uplink scheduling and the downlink scheduling may be both semi-persistent scheduling in this embodiment.

In one possible embodiment, the uplink scheduling type identifier and the downlink scheduling type identifier may be represented by bits, and different values of bits may indicate different scheduling types. For example, the uplink scheduling type identifier is denoted as UL-cif-presence, the downlink scheduling type identifier is denoted as DL-cif-presence, and each of the uplink scheduling type identifier and the downlink scheduling type identifier is represented by one bit. A value of 1 (or 0) of a bit corresponding to the UL-cif-presence indicates that the scheduling type of the uplink scheduling is an uplink self-scheduling. A value of 0 (or 1) of a bit corresponding to the UL-cif-presence indicate that the scheduling type of the uplink scheduling is an uplink cross-carrier scheduling. A value of 1 (or 0) of a bit corresponding to the DL-cif-presence indicates that the scheduling type of the downlink scheduling is a downlink self-scheduling. A value of 0 (or 1) of a bit corresponding to the DL-cif-presence indicates that the scheduling type of the downlink scheduling is a downlink cross-carrier scheduling. It should be noted that the representation of the uplink scheduling type identifier and the downlink scheduling type identifier is not limited to the above, and may be configured as needed.

S202 of, monitoring, by the user equipment, UE specific search space in a Physical Downlink Control Channel (PDCCH) of a scheduling cell and/or a cell on the unlicensed carrier according to the carrier scheduling configuration message.

Specifically, the user equipment may receive uplink scheduling signaling or downlink scheduling signaling on a specified cell according to an indication of the carrier scheduling configuration message.

It can be seen from the above embodiment that the user equipment may receive the uplink scheduling signaling and the downlink scheduling signaling on a corresponding cell according to scheduling signaling configured by the base station, so that the user equipment can accurately obtain transmission resources in uplink and downlink directions. As such, accurate reception and decoding of data are implemented, and a throughput of a communication system is improved.

Figure 3:
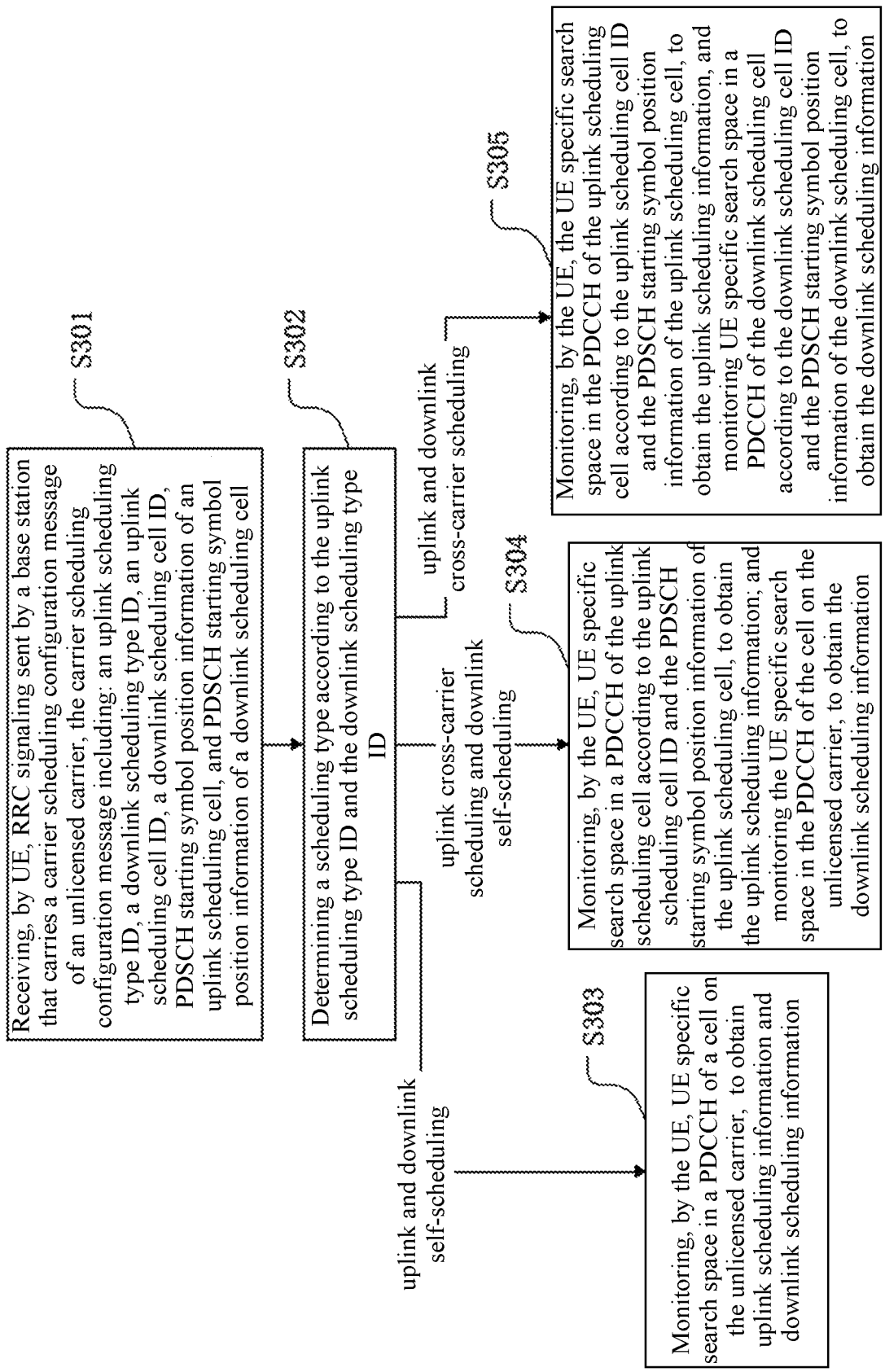
FIG. 3 is another flow chart of a method for receiving scheduling signaling on an unlicensed carrier in one embodiment of the present disclosure.

FIG. 3 is another flow chart of a method for receiving scheduling signaling on an unlicensed carrier in one embodiment of the present disclosure. In the embodiment of the present disclosure, the method includes:

S301 of, receiving, by user equipment, RRC signaling sent by a base station that carries a carrier scheduling configuration message on an unlicensed carrier. The carrier scheduling configuration message may include an uplink scheduling type identifier, a downlink scheduling type identifier, an uplink scheduling cell identifier, a downlink scheduling cell identifier, PDSCH starting symbol position information of an uplink scheduling cell, and PDSCH starting symbol position information of a downlink scheduling cell.

Specifically, the carrier scheduling configuration message may include two sets of scheduling cell identifiers and PDSCH starting symbol position information of scheduling cells. The uplink scheduling type identifier may indicate a scheduling type in an uplink direction, the downlink scheduling type identifier may indicate a scheduling type in a downlink direction, the uplink scheduling cell identifier may indicate an identity of a cell performing an uplink scheduling, the downlink scheduling cell identifier may indicate an identity of a cell performing a downlink scheduling, the PDSCH starting symbol position information of the uplink scheduling cell indicates a position of a PDSCH starting symbol of the cell performing the uplink scheduling, and the PDSCH starting symbol position information of the downlink scheduling cell indicates a position of a PDSCH starting symbol of the cell performing the downlink scheduling.

S302 of, determining, by the user equipment, a scheduling type according to the uplink scheduling type identifier and the downlink scheduling type identifier.

Specifically, the user equipment may parse the uplink scheduling type identifier and the downlink scheduling type identifier included in the carrier scheduling configuration message, and determine the scheduling type in the uplink direction and the scheduling type in the downlink direction.

S303 of, monitoring, by the user equipment, UE specific search space in a PDCCH of a cell on the unlicensed carrier, i.e. a current LAA SCell, to obtain uplink scheduling information and downlink scheduling information.

Specifically, the user equipment may determine that the uplink scheduling type identifier indicates an uplink self-scheduling, and the downlink scheduling type identifier indicates a downlink self-scheduling. Because the base station does not configure specific values of the uplink scheduling cell identifier, the downlink scheduling cell identifier, the PDSCH starting symbol position information of the uplink scheduling cell, and the PDSCH starting symbol position information of the downlink scheduling cell, the user equipment may directly monitor the UE specific search space in the cell on the unlicensed carrier, i.e. the current LAA SCell, to obtain the uplink scheduling information and the downlink scheduling information.

S304 of, monitoring, by the user equipment, UE specific search space in a PDCCH of the uplink scheduling cell according to the uplink scheduling cell identifier and the PDSCH starting symbol position information of the uplink scheduling cell, to obtain the uplink scheduling information; and monitoring the UE specific search space in the PDCCH of the cell on the unlicensed carrier, i.e. the current LAA SCell, to obtain the downlink scheduling information.

Specifically, the user equipment may determine that the uplink scheduling type identifier indicates an uplink cross-carrier scheduling, and the downlink scheduling type identifier indicates a downlink self-scheduling. Because the base station does not configure the downlink scheduling cell identifier and the specific value of the PDSCH starting symbol position information of the downlink scheduling cell, for a scheduling in an uplink direction, the user equipment may monitor the UE specific search space in the PDCCH of the uplink scheduling cell according to the uplink scheduling cell identifier and the PDSCH starting symbol position information of the uplink scheduling cell, to obtain the uplink scheduling information; for a scheduling in a downlink direction, the user equipment may directly monitor the UE specific search space in the PDCCH of the cell on the unlicensed carrier, i.e. the current LAA SCell, to obtain the downlink scheduling information.

S305 of, monitoring, by the user equipment, the UE specific search space in the PDCCH of the uplink scheduling cell according to the uplink scheduling cell identifier and the PDSCH starting symbol position information of the uplink scheduling cell, to obtain the uplink scheduling information, and monitoring UE specific search space in a PDCCH of the downlink scheduling cell according to the downlink scheduling cell identifier and the PDSCH starting symbol position information of the downlink scheduling cell, to obtain the downlink scheduling information.

Specifically, the user equipment may determine that the uplink scheduling type identifier indicates an uplink cross-carrier scheduling, and determine that the downlink scheduling type identifier indicates a downlink cross-carrier scheduling. Because the base station configures cell identifiers for both uplink direction and downlink direction, the user equipment may monitor the UE specific search space in the PDCCH of the uplink scheduling cell according to the uplink scheduling cell identifier and the PDSCH starting symbol position information of the uplink scheduling cell, to obtain the uplink scheduling information, and monitor the UE specific search space in the PDCCH of the downlink scheduling cell according to the downlink scheduling cell identifier and the PDSCH starting symbol position information of the downlink scheduling cell, to obtain the downlink scheduling information.

It can be seen from the above embodiment that the user equipment may receive the uplink scheduling signaling and the downlink scheduling signaling on a corresponding cell according to scheduling signaling configured by the base station, so that the user equipment can accurately obtain transmission resources in uplink and downlink directions. As such, accurate reception and decoding of data are implemented, and a throughput of a communication system is improved.

Figure 4:
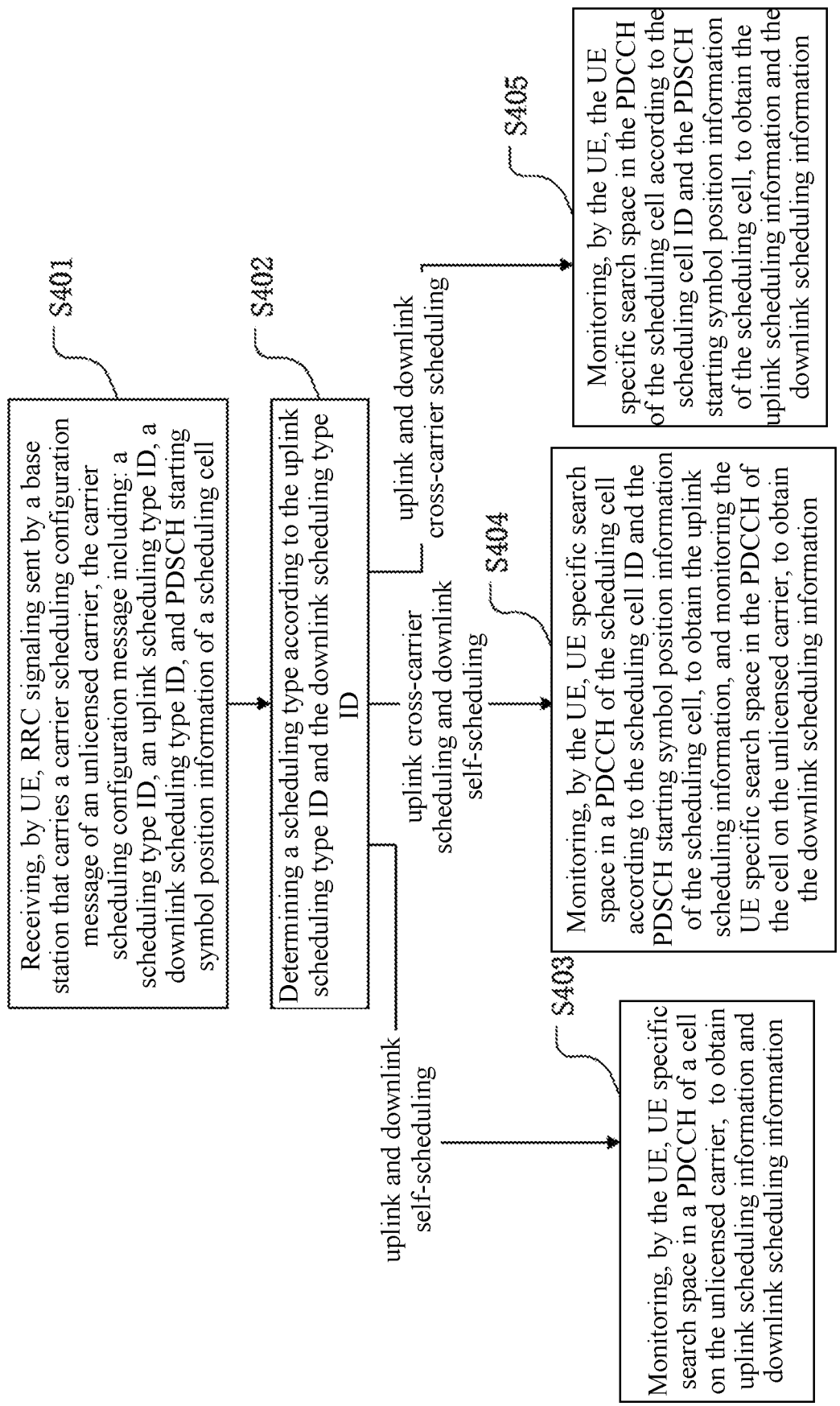
FIG. 4 is still another flow chart of a method for receiving scheduling signaling on an unlicensed carrier in one embodiment of the present disclosure.

FIG. 4 is still another flow chart of a method for receiving scheduling signaling on an unlicensed carrier in one embodiment of the present disclosure. In the embodiment of the present disclosure, the method includes:

S401 of, receiving, by user equipment, RRC signaling sent by a base station that carries a carrier scheduling configuration message on an unlicensed carrier. The carrier scheduling configuration message includes an uplink scheduling type identifier, a downlink scheduling type identifier, a scheduling cell identifier, and PDSCH starting symbol position information of the scheduling cell.

Specifically, the uplink scheduling type identifier may indicate a scheduling type in an uplink direction, the downlink scheduling type identifier may indicate a scheduling type in a downlink direction, the scheduling cell identifier may indicate an identity of a cell performing a cross-carrier scheduling, and the PDSCH starting symbol position information of the scheduling cell may indicate a position of a PDSCH starting symbol of the cell performing the cross-carrier scheduling.

S402 of, determining, by the user equipment, a scheduling type according to the uplink scheduling type identifier and the downlink scheduling type identifier.

Specifically, the user equipment may parse the uplink scheduling type identifier and the downlink scheduling type identifier included in the carrier scheduling configuration message, and determine the scheduling type in an uplink direction and the scheduling type in a downlink direction.

S403 of, monitoring, by the user equipment, UE specific search space in a PDCCH of a cell on the unlicensed carrier, i.e. a current LAA SCell, to obtain uplink scheduling information and downlink scheduling information.

Specifically, the user equipment may determine that the uplink scheduling type identifier indicates an uplink self-scheduling, and the downlink scheduling type identifier indicates a downlink self-scheduling. Because the scheduling cell identifier and the PDSCH starting symbol position information of the scheduling cell are configured for a cross-carrier scheduling, and the base station may not configure specific values of the scheduling cell identifier and the PDSCH starting symbol position information of the scheduling cell, and the user equipment may directly monitor the UE specific search space in the cell on the unlicensed carrier, i.e. the current LAA SCell, to obtain the uplink scheduling information and the downlink scheduling information.

S404 of, monitoring, by the user equipment, UE specific search space in a PDCCH of the scheduling cell according to the scheduling cell identifier and the PDSCH starting symbol position information of the scheduling cell, to obtain the uplink scheduling information, and monitoring the UE specific search space in the PDCCH of the cell on the unlicensed carrier, i.e. the current LAA SCell, to obtain the downlink scheduling information.

Specifically, the user equipment may determine that the uplink scheduling type identifier indicates an uplink cross-carrier scheduling, and the downlink scheduling type identifier may indicate a downlink self-scheduling. Because the scheduling cell identifier and the PDSCH starting symbol position information of the scheduling cell may be configured for a cross-carrier scheduling, and the base station may configure the scheduling cell identifier and the specific value of the PDSCH starting symbol position information of the scheduling cell for an uplink direction, for a scheduling in an uplink direction, the user equipment may monitor the UE specific search space in the PDCCH of the scheduling cell according to the scheduling cell identifier and the PDSCH starting symbol position information of the scheduling cell, to obtain the uplink scheduling information; for a scheduling in a downlink direction, the user equipment directly monitors the UE specific search space in the PDCCH of the cell on the unlicensed carrier, i.e. the current LAA SCell, to obtain the downlink scheduling information.

S405 of, monitoring, by the user equipment, the UE specific search space in the PDCCH of the scheduling cell according to the scheduling cell identifier and the PDSCH starting symbol position information of the scheduling cell, to obtain the uplink scheduling information and the downlink scheduling information.

Specifically, the user equipment may determine that the uplink scheduling type identifier indicates an uplink cross-carrier scheduling, and determine that the downlink scheduling type identifier indicates a downlink cross-carrier scheduling. The scheduling cell identifier and the PDSCH starting symbol position information of the scheduling cell may be configured for a cross-carrier scheduling, and the base station may configure specific values of the scheduling cell identifier and the PDSCH starting symbol position information of the scheduling cell for uplink direction and downlink direction, the scheduling cell identifier and the PDSCH starting symbol position information of the scheduling cell may be the same in the uplink direction and the downlink direction. Therefore, for scheduling in the uplink direction and the downlink direction, the user equipment may monitor the UE specific search space in the PDCCH of the scheduling cell according to the scheduling cell identifier and the PDSCH starting symbol position information of the scheduling cell, to obtain the uplink scheduling information and the downlink scheduling information.

Figure 5:
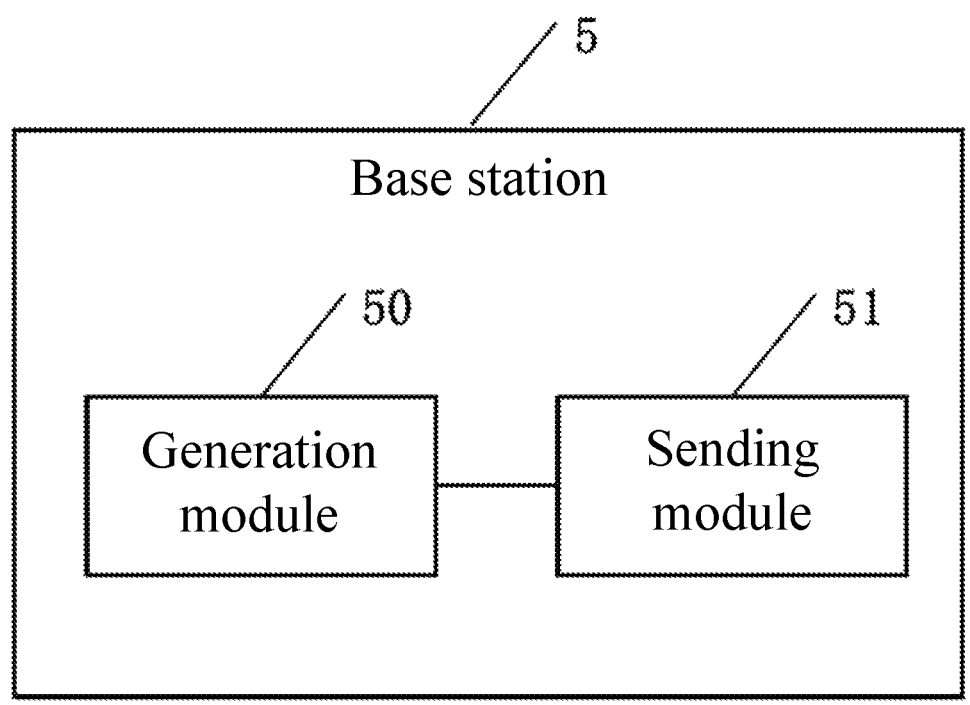
FIG. 5 is a schematic structural diagram of a base station in one embodiment of the present disclosure.

FIG. 5 is a schematic structural diagram of a base station in one embodiment of the present disclosure. The base station in the embodiment of the present disclosure executes the method for configuring scheduling signaling on an unlicensed carrier of FIG. 1. The terms and processes involved may refer to the embodiment of FIG. 1. The base station 5 may include: a generation module 50 and a sending module 51.

The generation module 50 is configured to generate a carrier scheduling configuration message of an unlicensed carrier. The carrier scheduling configuration message may include an uplink scheduling type identifier and a downlink scheduling type identifier.

The sending module 51 is configured to send, to user equipment (UE), RRC signaling that carries the carrier scheduling configuration message.

Optionally, the carrier scheduling configuration message may further include: an uplink scheduling cell identifier, a downlink scheduling cell identifier, PDSCH starting symbol position information of the uplink scheduling cell, and PDSCH starting symbol position information of the downlink scheduling cell.

Optionally, the uplink scheduling type identifier may indicate an uplink self-scheduling, the downlink scheduling type identifier may indicate a downlink self-scheduling, the uplink scheduling cell identifier, the PDSCH starting symbol position information of the uplink scheduling cell, the downlink scheduling cell identifier, and the PDSCH starting symbol position information of the downlink scheduling cell may be null; or the uplink scheduling type identifier may indicate an uplink cross-carrier scheduling, the downlink scheduling type identifier may indicate a downlink self-scheduling, and the downlink scheduling cell identifier and the PDSCH starting symbol position information of the downlink scheduling cell may be null; or the uplink scheduling type identifier may indicate an uplink cross-carrier scheduling, and the downlink scheduling type identifier may indicate s a downlink cross-carrier scheduling, where the uplink scheduling cell identifier and the downlink scheduling cell identifier may be the same or different.

Optionally, the carrier scheduling configuration message may further include:

a scheduling cell identifier and PDSCH starting symbol position information of a scheduling cell.

Optionally, the uplink scheduling type identifier may indicate an uplink self-scheduling, the downlink scheduling type identifier may indicate a downlink self-scheduling, and the scheduling cell identifier and the PDSCH starting symbol position information of the scheduling cell may be null; or the uplink scheduling type identifier may indicate an uplink cross-carrier scheduling, the downlink scheduling type identifier may indicate a downlink self-scheduling, and the scheduling cell identifier and the PDSCH starting symbol position information of the scheduling cell may correspond to an uplink scheduling; or the uplink scheduling type identifier may indicate an uplink cross-carrier scheduling, and the downlink scheduling type identifier may indicate a downlink cross-carrier scheduling, where the scheduling cell identifier and the PDSCH starting symbol position information of the scheduling cell may correspond to an uplink scheduling and a downlink scheduling.

This embodiment of the present disclosure and the method embodiment of FIG. 1 are based on the same concept, and the technical effects thereof are also the same. The processes in detail can refer to the description of the method embodiment 1, and are not repeated here.

Figure 6:
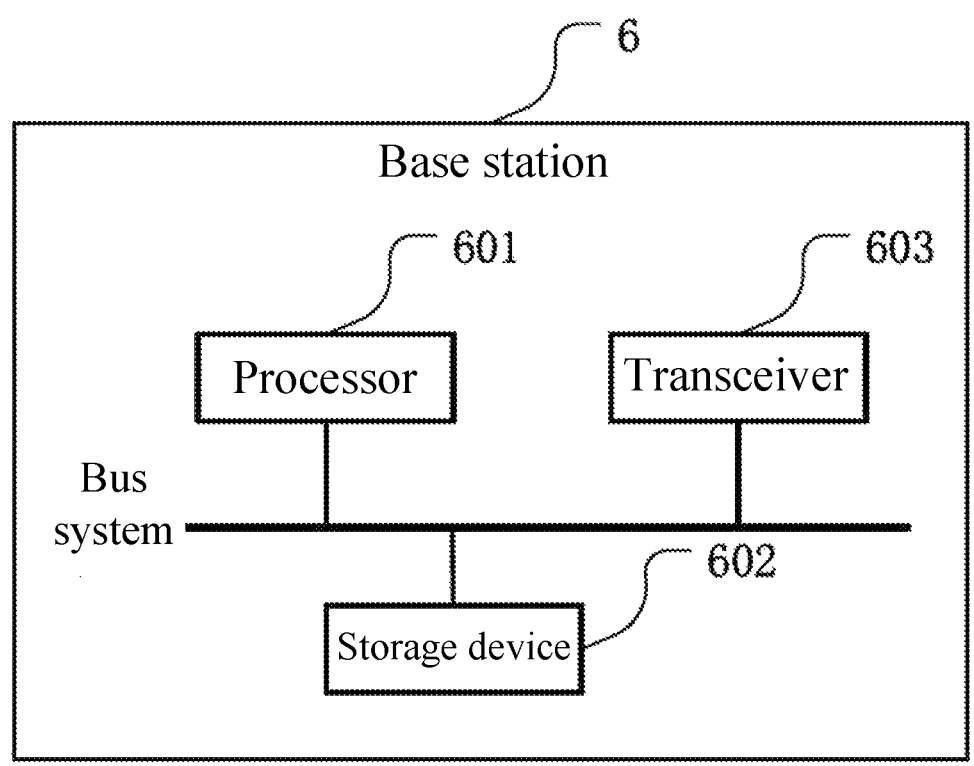
FIG. 6 is another schematic structural diagram of a base station in one embodiment of the present disclosure.

FIG. 6 is another schematic structural diagram of a base station in one embodiment of the present disclosure. In the embodiment of the present disclosure, the base station 6 may include a processor 601, a storage device 602, and a transceiver 603. The transceiver 603 is used for sending and receiving data with external devices. The number of processors 601 in the base station 6 can be one or more. In some embodiments of the present disclosure, the processor 601, the storage device 602, and the transceiver 603 may be connected through a bus system or other means. The base station 6 may be used for executing the method shown in FIG. 1. The meaning and examples of the terms involved in this embodiment may refer to the embodiment of FIG. 1, and details are not repeated here.

The storage device 602 stores program codes, and the processor 601 can execute the program codes stored in the storage device 602 to perform the following operations of:

generating a carrier scheduling configuration message of an unlicensed carrier, where the carrier scheduling configuration message may include an uplink scheduling type identifier and a downlink scheduling type identifier;

sending RRC signaling to user equipment that carries the carrier scheduling configuration message.

In one possible embodiment of the present disclosure, the carrier scheduling configuration message may further include: an uplink scheduling cell identifier, a downlink scheduling cell identifier, PDSCH starting symbol position information of the uplink scheduling cell, and PDSCH starting symbol position information of the downlink scheduling cell.

In one possible embodiment of the present disclosure, the uplink scheduling type identifier may indicate an uplink self-scheduling, the downlink scheduling type identifier may indicate a downlink self-scheduling, the uplink scheduling cell identifier, the PDSCH starting symbol position information of the uplink scheduling cell, the downlink scheduling cell identifier, and the PDSCH starting symbol position information of the downlink scheduling cell may be null; or the uplink scheduling type identifier indicates an uplink cross-carrier scheduling, the downlink scheduling type identifier indicates a downlink self-scheduling, and the downlink scheduling cell identifier and the PDSCH starting symbol position information of the downlink scheduling cell are null; or the uplink scheduling type identifier may indicate an uplink cross-carrier scheduling, and the downlink scheduling type identifier may indicate a downlink cross-carrier scheduling, where the uplink scheduling cell identifier and the downlink scheduling cell identifier may be the same or different.

In one possible embodiment of the present disclosure, the carrier scheduling configuration message may further include:

a scheduling cell identifier and PDSCH starting symbol position information of a scheduling cell.

In one possible embodiment of the present disclosure, the uplink scheduling type identifier may indicate an uplink self-scheduling, the downlink scheduling type identifier may indicate a downlink self-scheduling, and the scheduling cell identifier and the PDSCH starting symbol position information of the scheduling cell may be null; or the uplink scheduling type identifier may indicate an uplink cross-carrier scheduling, the downlink scheduling type identifier may indicate a downlink self-scheduling, and the scheduling cell identifier and the PDSCH starting symbol position information of the scheduling cell may corresponds to an uplink scheduling; or the uplink scheduling type identifier indicates an uplink cross-carrier scheduling, and the downlink scheduling type identifier indicates a downlink cross-carrier scheduling, where the scheduling cell identifier and the PDSCH starting symbol position information of the scheduling cell may corresponds to an uplink scheduling and a downlink scheduling.

Figure 7:
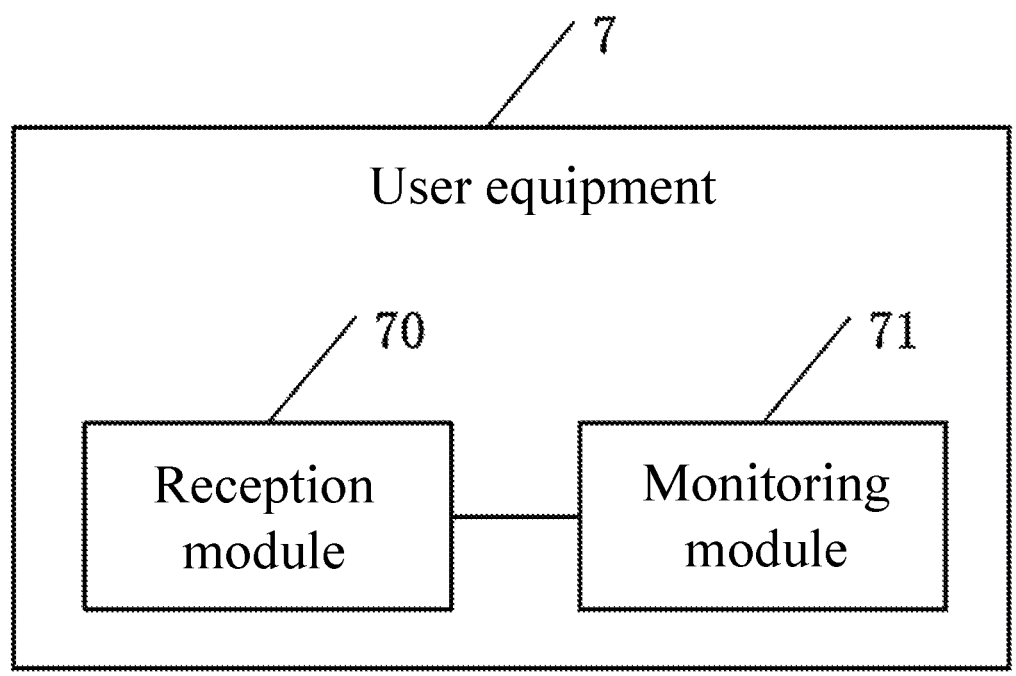
FIG. 7 is a schematic structural diagram of user equipment in one embodiment of the present disclosure.

FIG. 7 is a schematic structural diagram of user equipment in one embodiment of the present disclosure. The user equipment in the embodiment of the present disclosure executes the method for receiving scheduling signaling on an unlicensed carrier of FIG. 2. The terms and processes involved may refer to the embodiment of FIG. 2. The user equipment 7 may include: a reception module 70 and a monitoring module 71.

The reception module 70 is configured to receive RRC signaling sent by a base station that carries a carrier scheduling configuration message of an unlicensed carrier. The carrier scheduling configuration message may include: an uplink scheduling type identifier and a downlink scheduling type identifier.

The monitoring module 71 is configured to monitor UE specific search space in a PDCCH of a scheduling cell and/or a cell on the unlicensed carrier according to the carrier scheduling configuration message.

This embodiment of the present disclosure and the method embodiment of FIG. 2 are based on the same concept, and the technical effects thereof are also the same. The processes in detail can refer to the description of the method embodiment of FIG. 2, and are not repeated here.

Further optionally, the carrier scheduling configuration message may further include:

an uplink scheduling cell identifier, a downlink scheduling cell identifier, PDSCH starting symbol position information of an uplink scheduling cell, and PDSCH starting symbol position information of a downlink scheduling cell.

Optionally, the monitoring module 71 may be specifically configured to:

determine a scheduling type according to the uplink scheduling type identifier and the downlink scheduling type identifier;

monitor the UE specific search space in the PDCCH of the cell on the unlicensed carrier, i.e. a current LAA SCell, to obtain uplink scheduling information and downlink scheduling information, upon the condition that the uplink scheduling type identifier indicates an uplink self-scheduling, and the downlink scheduling type identifier indicates a downlink self-scheduling;

monitor UE specific search space in a PDCCH of the uplink scheduling cell according to the uplink scheduling cell identifier and the PDSCH starting symbol position information of the uplink scheduling cell, to obtain the uplink scheduling information, and monitor the UE specific search space in the PDCCH of the cell on the unlicensed carrier, i.e. the current LAA SCell, to obtain the downlink scheduling information, upon the condition that the uplink scheduling type identifier indicates an uplink cross-carrier scheduling, and the downlink scheduling type identifier indicates a downlink self-scheduling;

monitor the UE specific search space in the PDCCH of the uplink scheduling cell according to the uplink scheduling cell identifier and the PDSCH starting symbol position information of the uplink scheduling cell, to obtain the uplink scheduling information, and monitor UE specific search space in a PDCCH of the downlink scheduling cell according to the downlink scheduling cell identifier and the PDSCH starting symbol position information of the downlink scheduling cell, to obtain the downlink scheduling information, upon the condition that the uplink scheduling type identifier indicates an uplink cross-carrier scheduling, and the downlink scheduling type identifier indicates a downlink cross-carrier scheduling.

Further optionally, the carrier scheduling configuration message may further include:

a scheduling cell identifier and PDSCH starting symbol position information of a scheduling cell.

Optionally, the monitoring module 71 may be specifically configured to:

determine a scheduling type according to the uplink scheduling type identifier and the downlink scheduling type identifier;

monitor the UE specific search space in the PDCCH of the cell on the unlicensed carrier, i.e. a current LAA SCell, to obtain uplink scheduling information and downlink scheduling information, upon the condition that the uplink scheduling type identifier indicates an uplink self-scheduling, and the downlink scheduling type identifier indicates a downlink self-scheduling;

monitor the UE specific search space in the PDCCH of the scheduling cell according to the scheduling cell identifier and the PDSCH starting symbol position information of the scheduling cell, to obtain the uplink scheduling information, and monitor the UE specific search space in the PDCCH of the cell on the unlicensed carrier, i.e. the current LAA SCell, to obtain the downlink scheduling information, upon the condition that the uplink scheduling type identifier indicates an uplink cross-carrier scheduling, and the downlink scheduling type identifier indicates a downlink self-scheduling;

monitor the UE specific search space in the PDCCH of the scheduling cell according to the scheduling cell identifier and the PDSCH starting symbol position information of the scheduling cell, to obtain the uplink scheduling information and the downlink scheduling information, upon the condition that the uplink scheduling type identifier indicates an uplink cross-carrier scheduling, and the downlink scheduling type identifier indicates a downlink cross-carrier scheduling.

This embodiment of the present disclosure and the method embodiment of FIG. 3 and FIG. 4 are based on the same concept, and the technical effects thereof are also the same. The processes in detail can refer to the description of the method embodiments of FIG. 3 and FIG. 4, and are not repeated here.

Figure 8:
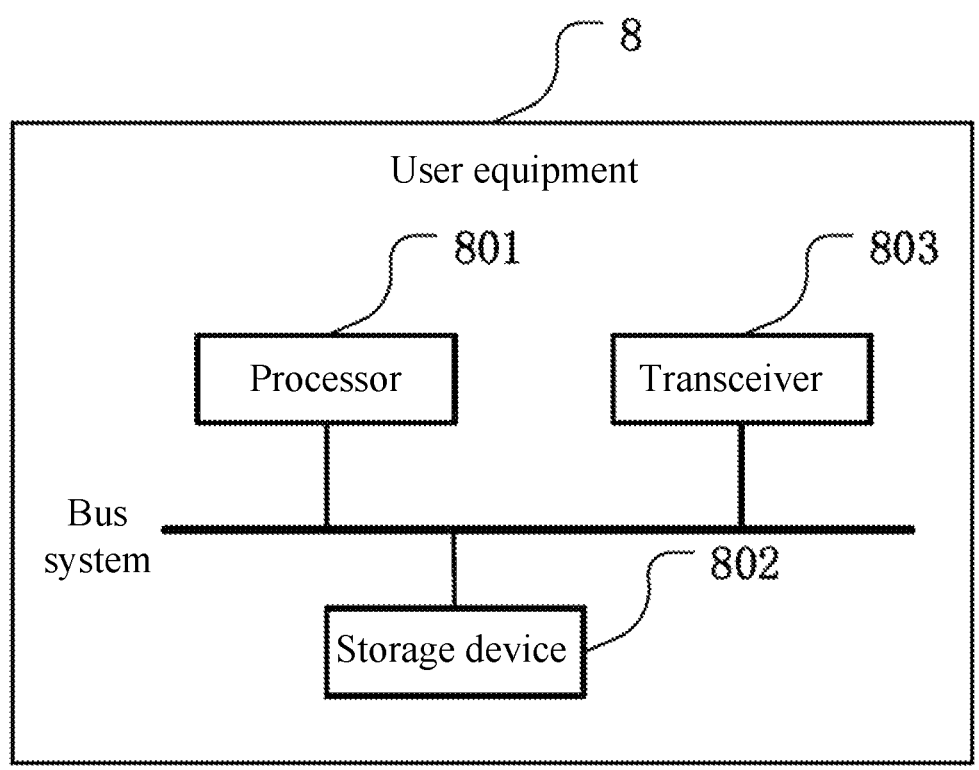
FIG. 8 is another schematic structural diagram of user equipment in one embodiment of the present disclosure.

FIG. 8 is another schematic structural diagram of user equipment in one embodiment of the present disclosure. In the embodiment of the present disclosure, the user equipment 8 may include a processor 801, a storage device 802, and a transceiver 803. The transceiver 803 is used for sending and receiving data with external devices. The number of processors 801 in the user equipment 8 can be one or more. In some embodiments of the present disclosure, the processor 801, the storage device 802, and the transceiver 803 may be connected through a bus system or other means. The user equipment 8 can be used for executing the method shown in FIG. 2. The meaning and examples of the terms involved in this embodiment may refer to the embodiment of FIG. 2, and details are not repeated here.

The storage device 802 stores program codes, and the processor 801 can execute the program codes stored in the storage device 802 to perform the following operations of:

receiving RRC signaling sent by a base station that carries a carrier scheduling configuration message of an unlicensed carrier, the carrier scheduling configuration message including: an uplink scheduling type identifier and a downlink scheduling type identifier;

monitoring UE specific search space in a PDCCH of a scheduling cell and/or a cell on the unlicensed carrier according to the carrier scheduling configuration message.

In one possible embodiment of the present disclosure, the carrier scheduling configuration message may further include:

an uplink scheduling cell identifier, a downlink scheduling cell identifier, PDSCH starting symbol position information of an uplink scheduling cell, and PDSCH starting symbol position information of a downlink scheduling cell.

In one possible embodiment of the present disclosure, monitoring, performed by the processor 801, UE specific search space in a PDCCH of a scheduling cell and/or a cell on the unlicensed carrier according to the carrier scheduling configuration message includes:

determining a scheduling type according to the uplink scheduling type identifier and the downlink scheduling type identifier;

monitoring the UE specific search space in the PDCCH of the cell on the unlicensed carrier, i.e. a current LAA SCell, to obtain uplink scheduling information and downlink scheduling information, upon the condition that the uplink scheduling type identifier indicates an uplink self-scheduling, and the downlink scheduling type identifier indicates a downlink self-scheduling;

monitoring UE specific search space in a PDCCH of the uplink scheduling cell according to the uplink scheduling cell identifier and the PDSCH starting symbol position information of the uplink scheduling cell, to obtain the uplink scheduling information, and monitoring the UE specific search space in the PDCCH of the cell on the unlicensed carrier, i.e. the current LAA SCell, to obtain the downlink scheduling information, upon the condition that the uplink scheduling type identifier indicates an uplink cross-carrier scheduling, and the downlink scheduling type identifier indicates a downlink self-scheduling;

monitoring the UE specific search space in the PDCCH of the uplink scheduling cell according to the uplink scheduling cell identifier and the PDSCH starting symbol position information of the uplink scheduling cell, to obtain the uplink scheduling information, and monitoring UE specific search space in a PDCCH of the downlink scheduling cell according to the downlink scheduling cell identifier and the PDSCH starting symbol position information of the downlink scheduling cell, to obtain the downlink scheduling information, upon the condition that the uplink scheduling type identifier indicates an uplink cross-carrier scheduling, and the downlink scheduling type identifier indicates a downlink cross-carrier scheduling.

In one possible embodiment of the present disclosure, the carrier scheduling configuration message may further include:

a scheduling cell identifier and PDSCH starting symbol position information of a scheduling cell.

In one possible embodiment of the present disclosure, monitoring, performed by the processor 801, UE specific search space in a PDCCH of a scheduling cell and/or a cell on the unlicensed carrier according to the carrier scheduling configuration message includes:

determining a scheduling type according to the uplink scheduling type identifier and the downlink scheduling type identifier;

monitoring the UE specific search space in the PDCCH of the cell on the unlicensed carrier, i.e. a current LAA SCell, to obtain uplink scheduling information and downlink scheduling information, upon the condition that the uplink scheduling type identifier indicates an uplink self-scheduling, and the downlink scheduling type identifier indicates a downlink self-scheduling;

monitoring the UE specific search space in the PDCCH of the scheduling cell according to the scheduling cell identifier and the PDSCH starting symbol position information of the scheduling cell, to obtain the uplink scheduling information, and monitoring the UE specific search space in the PDCCH of the cell on the unlicensed carrier, i.e. the current LAA SCell, to obtain the downlink scheduling information, upon the condition that the uplink scheduling type identifier indicates an uplink cross-carrier scheduling, and the downlink scheduling type identifier indicates a downlink self-scheduling;

monitoring the UE specific search space in the PDCCH of the scheduling cell according to the scheduling cell identifier and the PDSCH starting symbol position information of the scheduling cell, to obtain the uplink scheduling information and the downlink scheduling information, upon the condition that the uplink scheduling type identifier indicates an uplink cross-carrier scheduling, and the downlink scheduling type identifier indicates a downlink cross-carrier scheduling.

The user terminal provided by the embodiments of the present disclosure includes, but is not limited to, user terminal equipped with iOS®, Android®, Microsoft® or other operating system, such as a mobile phone. Other terminals may also be used, such as a laptop or a tablet or a desktop computer with a touch-sensitive surface (e.g., a touch screen display and/or a touch pad).

User equipment including a display and a touch-sensitive surface is hereinafter described. It should be understood, however, that the user equipment can include one or more other physical user interface devices, such as a physical keyboard, a mouse, and/or a joystick.

User equipment generally supports a variety of applications, such as one or more of a drawing application, a rendering application, a word processing application, a web page creation application, a disc editing application, a spreadsheet application, a game application, a phone application, a video conferencing application, an email application, an instant messaging application, a workout support application, a photo management application, a digital camera application, a digital video camera application, a web browsing application, a digital music player application, and/or a digital video player application.

Applications that can be executed on the user equipment can use at least one shared physical user interface device, such as a touch-sensitive surface. One or more functions of the touch-sensitive surface and corresponding information displayed on the user terminal may be adjusted and/or changed from one application to a next application, and/or adjusted and/or varied within applications. In this way, the shared physical architecture of the user equipment, such as a touch-sensitive surface, can support applications with a user interface that is intuitive to the user.

Persons of ordinary skill in the art can understand that all or part of the processes of the above embodiments may be implemented by executing a computer program by related hardware. The program may be stored in a computer readable storage medium. The program, when executed, may implement the flow of the method embodiments as described above. The storage medium may be a magnetic disk, an optical disk, a read-only memory (ROM), or a random access memory (RAM).

The above mentioned descriptions are merely preferred embodiments of the present disclosure, and should not limit the scope of the present disclosure. Persons of ordinary skill in the art can understand that implementing all or part of the processes of the above embodiments, and any modification and equivalent according to the claims of the present disclosure, are still within the scope of the present disclosure.

What is claimed:

1. A method for receiving scheduling signaling on an unlicensed carrier, comprising:
   receiving, by user equipment (UE), Radio Resource Control (RRC) signaling sent by a base station that carries a carrier scheduling configuration message of the unlicensed carrier, the carrier scheduling configuration message comprising: an uplink scheduling type identifier and a downlink scheduling type identifier; and
   performing a first monitoring, by the UE, of UE specific search space in a Physical Downlink Control Channel (PDCCH) of a scheduling cell and/or a cell on the unlicensed carrier according to the carrier scheduling configuration message;
   wherein the carrier scheduling configuration message further comprises:
      an uplink scheduling cell identifier, a downlink scheduling cell identifier, Physical Downlink Shared Channel (PDSCH) starting symbol position information of an uplink scheduling cell, and PDSCH starting symbol position information of a downlink scheduling cell; and
   wherein a first method of the first monitoring, by the UE, of UE specific search space in a PDCCH of a scheduling cell and/or a cell on the unlicensed carrier according to the carrier scheduling configuration message comprises:
      determining a scheduling type according to the uplink scheduling type identifier and the downlink scheduling type identifier,
      monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
      monitoring UE specific search space in a PDCCH of the uplink scheduling cell according to the uplink scheduling cell identifier and the PDSCH starting symbol position information of the uplink scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
      monitoring the UE specific search space in the PDCCH of the uplink scheduling cell according to the uplink scheduling cell identifier and the PDSCH starting symbol position information of the uplink scheduling cell, to obtain the uplink scheduling information, and monitoring UE specific search space in a PDCCH of the downlink scheduling cell according to the downlink scheduling cell identifier and the PDSCH starting symbol position information of the downlink scheduling cell, to obtain the downlink scheduling information, upon the condition that the uplink scheduling type identifier indicates an uplink cross-carrier scheduling, and the downlink scheduling type identifier indicates a downlink cross-carrier scheduling; or
   wherein the carrier scheduling configuration message further comprises:
      a scheduling cell identifier and PDSCH starting symbol position information of a scheduling cell; and
   wherein a second method of the first monitoring, by the UE, of UE specific search space in a PDCCH of a scheduling cell and/or a cell on the unlicensed carrier according to the carrier scheduling configuration message comprises:
      determining a scheduling type according to the uplink scheduling type identifier and the downlink scheduling type identifier,
      monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
      monitoring the UE specific search space in the PDCCH of the scheduling cell according to the scheduling cell identifier and the PDSCH starting symbol position information of the scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
      monitoring the UE specific search space in the PDCCH of the scheduling cell according to the scheduling cell identifier and the PDSCH starting symbol position information of the scheduling cell, to obtain the uplink scheduling information and the downlink scheduling information, upon the condition that the uplink scheduling type identifier indicates an uplink cross-carrier scheduling, and the downlink scheduling type identifier indicates a downlink cross-carrier scheduling.

2. User equipment (UE), comprising:
a storage device;
at least one processor; and
the storage device storing one or more programs, which when executed by the at least one processor, cause the at least one processor to:
receive Radio Resource Control (RRC) signaling sent by a base station that carries a carrier scheduling configuration message of an unlicensed carrier, the carrier scheduling configuration message comprising: an uplink scheduling type identifier and a downlink scheduling type identifier; and
perform a first monitoring of UE specific search space in a Physical Downlink Control Channel (PDCCH) of a scheduling cell and/or a cell on the unlicensed carrier according to the carrier scheduling configuration message;
wherein the carrier scheduling configuration message further comprises:
an uplink scheduling cell identifier, a downlink scheduling cell identifier, Physical Downlink Shared Channel (PDSCH) starting symbol position information of an uplink scheduling cell, and PDSCH starting symbol position information of a downlink scheduling cell; and
wherein a first method of the first monitoring of UE specific search space in a PDCCH of a scheduling cell and/or a cell on the unlicensed carrier according to the carrier scheduling configuration message comprises:
determining a scheduling type according to the uplink scheduling type identifier and the downlink scheduling type identifier,
monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
monitoring UE specific search space in a PDCCH of the uplink scheduling cell according to the uplink scheduling cell identifier and the PDSCH starting symbol position information of the uplink scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
monitoring the UE specific search space in the PDCCH of the uplink scheduling cell according to the uplink scheduling cell identifier and the PDSCH starting symbol position information of the uplink scheduling cell, to obtain the uplink scheduling information, and monitoring UE specific search space in a PDCCH of the downlink scheduling cell according to the downlink scheduling cell identifier and the PDSCH starting symbol position information of the downlink scheduling cell, to obtain the downlink scheduling information, upon the condition that the uplink scheduling type identifier indicates an uplink cross-carrier scheduling, and the downlink scheduling type identifier indicates a downlink cross-carrier scheduling; or
wherein the carrier scheduling configuration message further comprises:
a scheduling cell identifier and PDSCH starting symbol position information of a scheduling cell; and
wherein a second method of the first monitoring of UE specific search space in a PDCCH of a scheduling cell and/or a cell on the unlicensed carrier according to the carrier scheduling configuration message comprises:
determining a scheduling type according to the uplink scheduling type identifier and the downlink scheduling type identifier,
monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
monitoring the UE specific search space in the PDCCH of the scheduling cell according to the scheduling cell identifier and the PDSCH starting symbol position information of the scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
monitoring the UE specific search space in the PDCCH of the scheduling cell according to the scheduling cell identifier and the PDSCH starting symbol position information of the scheduling cell, to obtain the uplink scheduling information and the downlink scheduling information, upon the condition that the uplink scheduling type identifier indicates an uplink cross-carrier scheduling, and the downlink scheduling type identifier indicates a downlink cross-carrier scheduling.

3. A non-transitory storage medium having stored thereon instructions that, when executed by at least one processor of user equipment (UE), causes the at least one processor to perform a method for receiving scheduling signaling on an unlicensed carrier, the method comprising:
receiving Radio Resource Control (RRC) signaling sent by a base station that carries a carrier scheduling configuration message of the unlicensed carrier, the carrier scheduling configuration message comprising: an uplink scheduling type identifier and a downlink scheduling type identifier; and
performing a first monitoring of UE specific search space in a Physical Downlink Control Channel (PDCCH) of a scheduling cell and/or a cell on the unlicensed carrier according to the carrier scheduling configuration message;

wherein the carrier scheduling configuration message further comprises:
   an uplink scheduling cell identifier, a downlink scheduling cell identifier, Physical Downlink Shared Channel (PDSCH) starting symbol position information of an uplink scheduling cell, and PDSCH starting symbol position information of a downlink scheduling cell; and wherein a first method of the first monitoring of UE specific search space in a PDCCH of a scheduling cell and/or a cell on the unlicensed carrier according to the carrier scheduling configuration message comprises:
   determining a scheduling type according to the uplink scheduling type identifier and the downlink scheduling type identifier,
   monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
   monitoring UE specific search space in a PDCCH of the uplink scheduling cell according to the uplink scheduling cell identifier and the PDSCH starting symbol position information of the uplink scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
   monitoring the UE specific search space in the PDCCH of the uplink scheduling cell according to the uplink scheduling cell identifier and the PDSCH starting symbol position information of the uplink scheduling cell, to obtain the uplink scheduling information, and monitoring UE specific search space in a PDCCH of the downlink scheduling cell according to the downlink scheduling cell identifier and the PDSCH starting symbol position information of the downlink scheduling cell, to obtain the downlink scheduling information, upon the condition that the uplink scheduling type identifier indicates an uplink cross-carrier scheduling, and the downlink scheduling type identifier indicates a downlink cross-carrier scheduling; or wherein the carrier scheduling configuration message further comprises:
   a scheduling cell identifier and PDSCH starting symbol position information of a scheduling cell; and wherein a second method of the first monitoring of UE specific search space in a PDCCH of a scheduling cell and/or a cell on the unlicensed carrier according to the carrier scheduling configuration message comprises:
   determining a scheduling type according to the uplink scheduling type identifier and the downlink scheduling type identifier,
   monitoring the UE specific search space in the PDCCH of the cell on the unlicensed carrier, to obtain uplink scheduling information and downlink scheduling information, upon the condition that the uplink scheduling type identifier indicates an uplink self-scheduling, and the downlink scheduling type identifier indicates a downlink self-scheduling,
   monitoring the UE specific search space in the PDCCH of the scheduling cell according to the scheduling cell identifier and the PDSCH starting symbol position information of the scheduling cell, to obtain the uplink scheduling information, and monitoring the UE specific search space in the PDCCH of the cell on the unlicensed carrier, to obtain the downlink scheduling information, upon the condition that the uplink scheduling type identifier indicates an uplink cross-carrier scheduling, and the downlink scheduling type identifier indicates a downlink self-scheduling, and
   monitoring the UE specific search space in the PDCCH of the scheduling cell according to the scheduling cell identifier and the PDSCH starting symbol position information of the scheduling cell, to obtain the uplink scheduling information and the downlink scheduling information, upon the condition that the uplink scheduling type identifier indicates an uplink cross-carrier scheduling, and the downlink scheduling type identifier indicates a downlink cross-carrier scheduling.

4. The method according to claim 1, wherein the uplink scheduling type identifier indicates an uplink self-scheduling, the downlink scheduling type identifier indicates a downlink self-scheduling, the uplink scheduling cell identifier, the PDSCH starting symbol position information of the uplink scheduling cell, the downlink scheduling cell identifier, and the PDSCH starting symbol position information of the downlink scheduling cell are null; or
   the uplink scheduling type identifier indicates an uplink cross-carrier scheduling, the downlink scheduling type identifier indicates a downlink self-scheduling, and the downlink scheduling cell identifier and the PDSCH starting symbol position information of the downlink scheduling cell are null; or
   the uplink scheduling type identifier indicates an uplink cross-carrier scheduling, the downlink scheduling type identifier indicates a downlink cross-carrier scheduling, and the uplink scheduling cell identifier and the downlink scheduling cell identifier are the same or different.

5. The method according to claim 1, wherein the uplink scheduling type identifier indicates an uplink self-scheduling, the downlink scheduling type identifier indicates a downlink self-scheduling, and the scheduling cell identifier and the PDSCH starting symbol position information of the scheduling cell are null; or
   the uplink scheduling type identifier indicates an uplink cross-carrier scheduling, the downlink scheduling type identifier indicates a downlink self-scheduling; or
   the uplink scheduling type identifier indicates an uplink cross-carrier scheduling, the downlink scheduling type identifier indicates a downlink cross-carrier scheduling, and the scheduling cell identifier and the PDSCH starting symbol position information of the scheduling cell correspond to an uplink scheduling and a downlink scheduling.

6. The method according to claim 1, wherein each of the uplink scheduling type identifier and the downlink scheduling type identifier is represented by one bit.

7. The method according to claim 2, wherein the uplink scheduling type identifier indicates an uplink self-scheduling, the downlink scheduling type identifier indicates a downlink self-scheduling, the uplink scheduling cell identifier, the PDSCH starting symbol position information of the uplink scheduling cell, the downlink scheduling cell identifier, and the PDSCH starting symbol position information of the downlink scheduling cell are null; or the uplink scheduling type identifier indicates an uplink cross-carrier scheduling, the downlink scheduling type identifier indicates a downlink self-scheduling, and the downlink scheduling cell identifier and the PDSCH starting symbol position information of the downlink scheduling cell are null; or the uplink scheduling type identifier indicates an uplink cross-carrier scheduling, the downlink scheduling type identifier indicates a downlink cross-carrier scheduling, and the uplink scheduling cell identifier and the downlink scheduling cell identifier are the same or different.

8. The method according to claim 2, wherein the uplink scheduling type identifier indicates an uplink self-scheduling, the downlink scheduling type identifier indicates a downlink self-scheduling, and the scheduling cell identifier and the PDSCH starting symbol position information of the scheduling cell are null; or the uplink scheduling type identifier indicates an uplink cross-carrier scheduling, the downlink scheduling type identifier indicates a downlink self-scheduling; or the uplink scheduling type identifier indicates an uplink cross-carrier scheduling, the downlink scheduling type identifier indicates a downlink cross-carrier scheduling, and the scheduling cell identifier and the PDSCH starting symbol position information of the scheduling cell correspond to an uplink scheduling and a downlink scheduling.

9. The method according to claim 2, wherein each of the uplink scheduling type identifier and the downlink scheduling type identifier is represented by one bit.

10. The base station according to claim 3, wherein the uplink scheduling type identifier indicates an uplink self-scheduling, the downlink scheduling type identifier indicates a downlink self-scheduling, the uplink scheduling cell identifier, the PDSCH starting symbol position information of the uplink scheduling cell, the downlink scheduling cell identifier, and the PDSCH starting symbol position information of the downlink scheduling cell are null; or the uplink scheduling type identifier indicates an uplink cross-carrier scheduling, the downlink scheduling type identifier indicates a downlink self-scheduling, and the downlink scheduling cell identifier and the PDSCH starting symbol position information of the downlink scheduling cell are null; or the uplink scheduling type identifier indicates an uplink cross-carrier scheduling, the downlink scheduling type identifier indicates a downlink cross-carrier scheduling, and the uplink scheduling cell identifier and the downlink scheduling cell identifier are the same or different.

11. The base station according to claim 3, wherein the uplink scheduling type identifier indicates an uplink self-scheduling, the downlink scheduling type identifier indicates a downlink self-scheduling, and the scheduling cell identifier and the PDSCH starting symbol position information of the scheduling cell are null; or the uplink scheduling type identifier indicates an uplink cross-carrier scheduling, the downlink scheduling type identifier indicates a downlink self-scheduling; or the uplink scheduling type identifier indicates an uplink cross-carrier scheduling, the downlink scheduling type identifier indicates a downlink cross-carrier scheduling, and the scheduling cell identifier and the PDSCH starting symbol position information of the scheduling cell correspond to an uplink scheduling and a downlink scheduling.

12. The base station according to claim 3, wherein each of the uplink scheduling type identifier and the downlink scheduling type identifier is represented by one bit.

* * * * *